Patented May 4, 1943

2,318,360

UNITED STATES PATENT OFFICE 2,318,360

ABRASIVE

Raymond C. Benner and Henry N. Baumann, Jr., Niagara Falls, N. Y., assignors to The Carborundum Company, Niagara Falls, N. Y., a corporation of Delaware Application May 5, 1941, Serial No. 391,954

6 Claims. (Cl. 51—309)

This invention relates to the manufacture of abrasive material from crystalline alumina and to abrasive articles made therefrom, and in particular to a method of modifying crystalline alpha alumina for use as an abrasive so that it will have new physical properties especially adapted to specific abrasive purposes. Crystalline alumina for abrasive purposes is ordinarily made by fusing natural aluminous ores such as bauxite, or artificial aluminous ores such as the white aluminous material obtained by the Bayer process. Such fusion is generally carried out in an electric furnace, the process consisting essentially in fusing the raw material to a liquid with little or no added treatment except that in some cases there may be a reduction and removal of such impurities as iron and silica. On cooling, this fused mass forms a pig or ingot which is afterwards crushed and screened through different size screens in order to obtain the various sizes of commercially used abrasive grains.

We have found that if from about 1 per cent to 10 per cent of monazite sand is added to a source of alumina containing at least 90 per cent aluminum oxide and the mixture fused or sintered that a crystalline abrasive material tending to have a distinct crystalline habit is formed. The crystalline habit of this material is the rhombohedral form of alpha alumina, alpha alumina being the name applied to corundum produced artificially.

Figure 1:
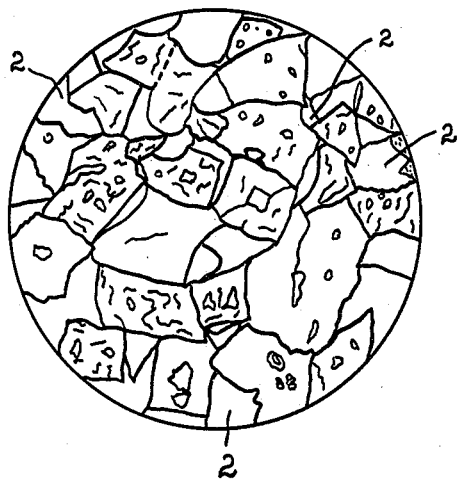

In Fig. 1 is shown a structure representative of that of fused masses of alumina containing small amounts of monazite sand. Fig. 1 is taken from a photomicrograph (magnification 55X) of a petrographic thin section of the mass resulted from the fusion of 97 per cent of white alumina made by the Bayer process and 3 per cent pulverized monazite sand. Many of the euhedral crystals appearing in Fig. 1 exhibit an approximately square cross section which in this case indicates a rhombohedral crystalline form. In Fig. 1 scattered pores are shown by clear areas 2.

Figure 2:
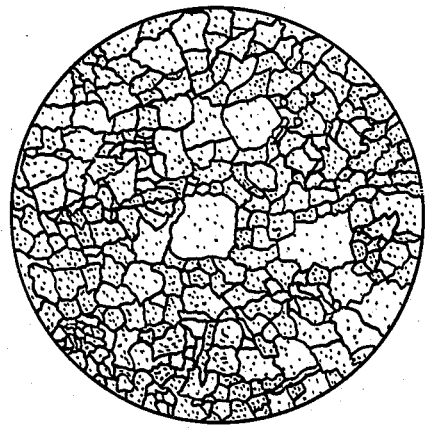

In Fig. 2 is shown a structure characteristic of bodies obtained by sintering together white alumina with small amounts of pulverized monazite sand. Fig. 2 is taken from a photomicrograph (magnification 80X) of a petrographic thin section of a sintered mass composed of 99 per cent alumina and 1 per cent monazite sand. As will be noted, the relatively close packing of the crystals in the sintered mass prevents development of euhedral crystals exhibiting the rhombohedral form.

Any material designed for wide use as an abrasive, particularly in the grinding of metals, must have as a first requisite a hardness as measured on Mohs scale of at least 8. Natural corundum has a hardness of 9 on Mohs scale and artificial aluminous abrasives will also be of the order of 9 in hardness. Mohs scale however, is merely a qualitative index of hardness. It does not indicate degrees of hardness accurately. Indeed as pointed out by C. E. Wooddell in vol. 68, (1935) pages 111–130 of the Transactions of the Electrochemical Society, the difference in hardness between corundum (Mohs 9) and diamond (Mohs 10) is far greater than the difference between quarts (Mohs 7) and corundum (Mohs 9). It will thus be seen that for practical purposes some quantitative indication of hardness is necessary and such a method is described in the article by Wooddell mentioned above.

We have found that by our invention we may cause the hardness of artificial corundum to vary through a considerable range. The following table gives hardness determinations according to the Wooddell method of a series of fusions of white aluminous ore and monazite sand in which the monazite content of the composition is varied, No. 2 of the series tabulated being the material the structure of which is illustrated in Fig. 1. The hardness is given on a scale in which corundum is 9 and diamond bort is 10.

Table

| Sample number | Composition | | Hardness |
|---|---|---|---|
| 1 | White aluminous ore | 99% | 9.07 |
|   | Monazite sand | 1% |  |
| 2 | White aluminous ore | 97% | 9.09 |
|   | Monazite sand | 3% |  |
| 3 | White aluminous ore | 90% | 9.05 |
|   | Monazite sand | 10% |  |
| 4 | White aluminous ore | 100% | 9.03 |

Thus far the description of the invention has been confined mostly to production by electric furnace fusion of our improved abrasive material. Similar compositions can be made for abrasive purposes in other ways, such as by sintering a raw batch, producing thereby material like that shown in Fig. 2. This sintering process is carried out as follows. The raw mix is thoroughly mixed and pulverized by ball milling, a small amount of dextrin is added to serve as a temporary bond, after which the mix is formed under pressure into blocks, and the formed blocks fired in a combustion type kiln to a temperature appreciably below the fusion point of alumina. The resulting product is a hard compact mass of closely packed alumina crystals. Fig. 2 shows the structure of a product made by the method just described. The block from which the thin section represented by Fig. 2 was made, was prepared by mixing together 1 per cent by weight of finely divided monazite sand and 99 per cent of white alumina ore. The mixture was formed under a pressure of 2000 psi and sintered by firing to about 1800° C. at which temperature it was held for 2 hours. The hardness of this monazite-modified alumina was 8,975 which compares favorably with 8.96, the hardness of unmodified sintered alumina. Hardness was measured by the Wooddell method previously mentioned.

Blocks of similar composition may be formed in like fashion and subsequently be crushed and screened to provide abrasive grain. The sintered masses may also be formed as shaped articles such, for example, as sharpening stones. After sintering, such a stone may be dressed in the conventional way by lapping and then used for fine grinding or polishing. In articles formed by sintering processes of the type just described, the individual crystals are almost all anhedral. However, the fact that they are in general equidimensional is evidence that the tendency to form rhombohedra exists.

Monazite sands obtained from different sources vary somewhat in composition, but they are all composed chiefly of phosphates of the cerium family of elements, that is, cerium praseodymium, neodymium and lanthanum. They also contain minor amounts of other compounds, particularly those of thorium. Monazite is quite refractory, and apparently does not combine chemically with alumina. When fused or sintered with aluminous ore, it is well dispersed, and on cooling has little tendency to segregate. Particularly in the case of sintered mixes it promotes the development of a dense structure, the sintered product being quite free of included pores in the alpha alumina crystals and also of interstitial pores.

Abrasive grain made according to our invention, whether produced by fusion or by sintering, may be used in the manufacture of bonded abrasive articles such as abrasive stones, grinding wheels or the like; or in the manufacture of coated abrasives, such as abrasive paper and cloth, wheels, disks and the like. The following examples are typical of the bonded abrasive products which can be made and illustrate some of the various types of bonds which are useful with our novel abrasive grain. To this novel grain we have given the name monazite-modified alumina and it will be so referred to hereinafter.

*Example I*

Parts by weight
80 grit monazite-modified alumina grain____ 90
Powdered heat-hardenable phenolic resin____ 10
Furfural _____ Sufficient The abrasive grain is wet with sufficient furfural to allow the grains to be coated with the powdered phenolic resin. The amount of furfural used is so chosen that substantially dry resin-coated grains are produced without there being any substantial remainder of loose resin. The coated grains are pourable and are, after being distributed uniformly in a mold, cold pressed at 2000 psi and cured in accordance with the usual practice in making phenolic resin-bonded abrasive articles, a maximum temperature of 350° F. being used.

*Example II*

Parts by weight
16 grit monazite-modified alumina grain____ 79.5
Crude rubber_____ 7
Sulphur_____ 3.5
Filler_____ 10.0

These ingredients may be employed for making rubber bonded grinding wheels utilizing the abrasive of our invention. The crude rubber is first plasticized by milling on rolls or in a Banbury mixer. The compounding ingredients, that is, the sulphur and filler, are then added while continuing the milling until a homogeneous mass is formed. The abrasive particles are then added to the rubber, a small amount at a time, until all of the grain has been incorporated uniformly throughout the rubber mass. After forming the abrasive-rubber mix into sheets of the required thickness disks of the desired size are died or cut out of the sheet and cured in the manner usually employed with rubber bonded articles. The filler used may comprise whiting, magnesia, clay cryolite or other reinforcing or modifying materials well known in the art.

*Example III*

Parts by weight
40 grit monazite-modified alumina grain____ 90
Ceramic bond_____ 10
Sulfite residue adhesive (dry)_____ .5
Water_____ 1.5

These ingredients may be employed to produce a ceramic bonded abrasive article using our novel abrasive grain. The dry ingredients are thoroughly mixed, the water is added, and mixing is continued until a homogeneous damp mixture is obtained. This mixture is passed through a 14 mesh screen and is then placed in a mold, pressed at 1500 psi, dried and fired or burned at a temperature of 1300° C. A ceramic bond suitable for use in carrying out this example consists of the following ingredients which should be pre-mixed and screened through an 80 mesh screen:

Parts by weight
Albany slip clay_____ 80
Stoneware clay_____ 20

It is not desired to confine our invention to the use of white alumina ore or alumina from the Bayer process in the production of our novel abrasive grain. Other sources of alumina may be used including crude or refined bauxite, either calcined or uncalcined, and scrap aluminous materials. Moreover, as there may be certain equivalent but more costly materials which could be substituted for monazite sand in the practice of our invention, it is understood that the examples herein given are to be interpreted as illustrative only and not limiting.

Where in the appended claims, Wooddell hardness is referred to, Mohs hardness as measured by the Wooddell method herein referred to is meant.

In the appended claims "monazite" is meant to include the mineral monazite as well as concentrates of different compounds occurring therein or artificially prepared substances chemically similar to constituents thereof as well as compounds of cerium, praseodymium, neodymium and lanthanum which at the high temperatures employed in our process produce results like monazite in modifying alpha alumina.

Having described and explained our invention, we claim:

1. As a new article of manufacture, an abrasive or wear-resistant material consisting essentially of alumina having intergranularly dispersed therein a minor amount of monazite.

2. As a new article of manufacture an abrasive or wear-resistant material composed essentially of alumina having intergranularly dispersed therein 1 to 10% of monazite.

3. As a new article of manufacture an abrasive or wear-resistant material composed essentially of the fusion product of alumina and from 1 to 10% of monazite.

4. As a new article of manufacture an abrasive or wear-resistant material composed essentially of the product produced by sintering together finely divided alumina and from 1 to 10% of finely divided monazite.

5. The process of producing a novel abrasive or wear-resistant material which comprises sintering together in finely divided form alumina and from 1 to 10% of monazite at a temperature of about 1800° C.

6. The process of producing a novel abrasive or wear-resistant material which comprises fusing together alumina and from 1 to 10% of monazite.

RAYMOND C. BENNER.
HENRY N. BAUMANN, JR.